United States Patent [19]

Agostini

[11] Patent Number: 4,482,993
[45] Date of Patent: Nov. 13, 1984

[54] MOVING DRIVE SPINDLE FOR SLOT-TYPE PLAYER APPARATUS

[75] Inventor: Louis P. Agostini, Sint-Pieters-Leeuw, Belgium

[73] Assignee: Staar S. A., Belgium

[21] Appl. No.: 485,848

[22] Filed: Apr. 18, 1983

[30] Foreign Application Priority Data

Apr. 29, 1982 [BE] Belgium .................................. 893.023

[51] Int. Cl.³ .......................... G11B 1/00; G11B 25/04
[52] U.S. Cl. .................................... 369/263; 369/77.1; 369/258; 369/264; 369/266
[58] Field of Search ............... 369/264, 266, 258, 263, 369/77.1, 77.2

[56] References Cited

U.S. PATENT DOCUMENTS

| 2,207,251 | 7/1940 | Guedon | 369/266 |
| 3,658,347 | 4/1972 | Cheeseboro | 369/77.1 |
| 3,940,793 | 2/1976 | Bleiman | 369/77.2 |
| 4,068,851 | 1/1978 | Yamamura | 369/266 |
| 4,305,145 | 12/1981 | Hughes et al. | 369/77.2 |

FOREIGN PATENT DOCUMENTS 2466077 3/1981 France .
2080009 7/1980 United Kingdom ............... 369/77.2

Primary Examiner—Steven L. Stephan
Attorney, Agent, or Firm—Leydig, Voit, Osann Mayer and Holt Ltd.

[57] ABSTRACT

A disc record apparatus having a fixed housing including an entrance slot for a disc record and a surface to slidably receive a disc record inserted edge first in its own plane through said slot to a playing position has a drive spindle for the disc record mounted in a spindle or motor housing for translation axially of the spindle and perpendicularly relative to the plane of the disc record. The spindle is movable in tranlation from an insertion position displaced from the plane of the record to an operative position in engagement centrally with a disc record in playing position for rotating the disc record. A motor driven cam member translates the spindle housing. A movable gate is provided for the entrance slot and the motor driven cam member is connected for opening and closing the gate so that a disc record may be inserted or ejected coordinated with translation movement of the spindle. An ejection mechanism driven from the same motor driven cam member is provided for automatically ejecting the disc record.

9 Claims, 10 Drawing Figures

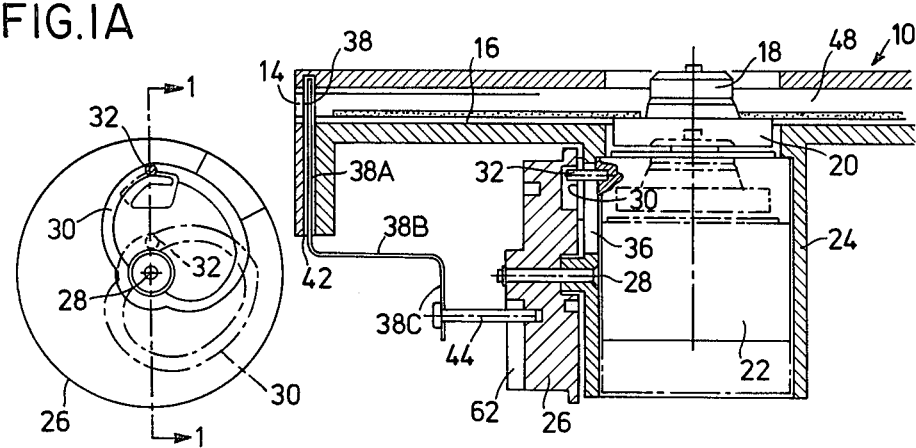
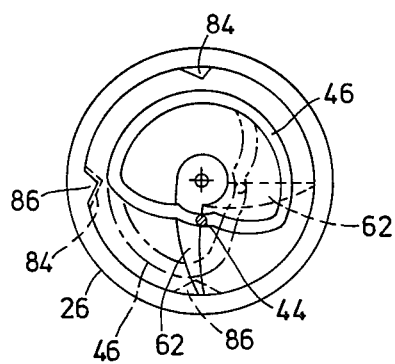

MOVING DRIVE SPINDLE FOR SLOT-TYPE PLAYER APPARATUS

TECHNICAL FIELD

The present invention relates to disc record player apparatus and, more particularly, to slot-type disc record player apparatus with automatic mechanism for engaging and disengaging a disc drive with an inserted disc record.

BACKGROUND ART

Disc player apparatus of the slot type have been marketed having mechanism which translates disc records perpendicularly from their plane of insertion to their playing position in order to engage the disc drive. This type of apparatus is objected to by some users who consider that their disc records are handled with less care by mechanism in such apparatus than if they were to position the disc records themselves.

DISCLOSURE OF THE INVENTION

The principal object of the present invention is to provide an apparatus which overcomes such objections in which a disc drive spindle is translated axially of the spindle and perpendicularly relative to a disc record to engage the drive with a disc record in playing position, thereby allowing the disc record to be maintained in its own plane when it is inserted or ejected in a slot-type player apparatus.

A related object of the invention is to provide an apparatus in which a disc drive spindle is engaged and disengaged by translation movement relative to a disc record in playing position and in which the disc record is inserted and ejected by moving it edge first in its own plane to and from the playing position through the entrance slot of the apparatus.

A further object is to provide a slot-type player apparatus which is particularly suited for compact disc (CD) records in which a CD record is inserted through a slot, a disc drive spindle is engaged and disengaged by translation movement relative to the CD record and a gate is provided for the slot, the opening and closing of the gate being coordinated with the translation movement of the disc drive spindle so that the CD record may be automatically loaded in the playing position and ejected.

BRIEF DESCRIPTION OF THE DRAWINGS

Further objects will become evident from the following description and the following drawings, in which:

FIG. 1 is a view in cross section illustrating a record player apparatus embodying the invention and having an axially movable drive spindle;

FIGS. 1A and 1B are views illustrating from opposite sides a cam member included in the apparatus of FIG. 1;

BEST MODE FOR CARRYING OUT THE INVENTION

Figure 2:
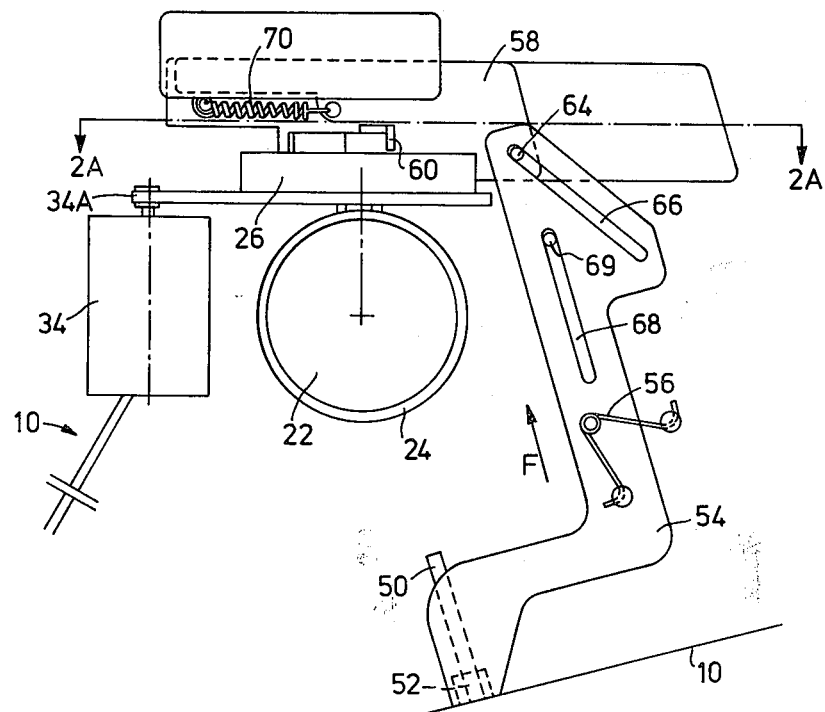
FIG. 2 is a fragmentary bottom plan view of the apparatus shown in FIG. 1 illustrating the mechanism for ejecting a disc record.

Referring to FIG. 1, a slot-type record player apparatus is illustrated particularly, but not exclusively, suited for "compact disc" records. CD records are rotated at high speed and read by laser detection devices movable radially across the surface of the records, for example, along a radial path P indicated in FIGS. 4 and 5. As shown in FIG. 1, the apparatus has a fixed housing 10 with an entrance slot 14 for a disc record and having a substantially horizontal surface 16 shown extending from the slot 14 for slidably receiving the disc record when inserted edge first in its own plane through the slot and for conveying the disc record to the playing position of FIG. 1. The radial path P may be provided by a slot in the surface 16 which preferably has a V-shaped surface as described in commonly assigned U.S. Ser. No. 441,923 entitled "Slot Type Disc Recorder And/Or Player Apparatus".

In carrying out this invention, a drive for the disc record includes a vertical drive spindle 18 having a hub 20 adapted for engagement centrally with a disc record rotatably mounted in a spindle housing 22 which is mounted for translation upwardly and downwardly axially of the spindle 18 and perpendicularly to the plane of the disc record. For supporting the spindle housing 22, which may comprise the drive motor housing, it is shown herein movable within a cylinder 24 which extends down from the fixed housing 10. In keeping with the invention, motor driven means are provided for translating the spindle housing 22 from an insertion position shown in phantom in FIG. 1, displaced below the plane of the disc record so as to be clear of the disc record when it is inserted or ejected, to an operative position with the hub 20 in engagement centrally with a disc record in playing position. Means (not shown) are also provided for clamping the disc record to the hub for high speed rotation, preferably a clamping mechanism as shown in U.S. Ser. No. 457,360, entitled "Disc Player Having Self-Actuated Magnetic Clamping Device".

For imparting translation movement to the spindle housing 22, a cam member 26 is rotatably supported on a horizontal shaft 28 extending from the cylinder 24, having a cam groove 30 on the side of the cam member 26 facing the cylinder 24 (FIG. 1A) and acting on a cam follower pin 32 fixed to the spindle housing 22 to move the spindle housing upwardly and downwardly as the cam member rotates. Rotation is caused by a second motor 34 (FIGS. 2, 3) mounted on the fixed housing 10 and connected by a drive belt 34A to the cam member 26. The cam follower pin 32 is confined within a vertical slot 36 in the wall of the cylinder 24 and the phasing of the translation movement of the spindle housing 22 is controlled by the configuration of the cam groove 30 as the cam member rotates, as illustrated in FIG. 1A, FIG. 1A illustrating in phantom the position of the cam groove 30 corresponding to the lower position of the spindle housing 22, shown also in phantom in FIG. 1.

Further in accordance with the invention, a gate 38 is provided for opening and closing the entrance slot 14 so that a disc record may be inserted or ejected coordinated with translation movement of the spindle housing 22 between the lower insertion position and the raised operative position. By this means, the gate 38 is opened to permit a disc record to be inserted through the slot 14 while the spindle 18 is positioned below the plane of movement. The gate 38 is closed to block access when the disc record is engaged and clamped to the spindle and hub 18, 20 and driven at high speed by the drive. The gate 38 is opened when the drive spindle 18 is moved downwardly to allow the disc record to be ejected. Referring to FIG. 1, the gate 38 is a stiff sheet member bent to provide an upwardly extending leg 38A which is slidably received in a vertical slot 42 in the fixed housing 10 and intersects the entrance slot 14. An intermediate portion 38B of the sheet member extends horizontally and a downwardly extending leg 38C is connected to a lug 44 which is received in a cam track 46 on the surface of the cam member 26 facing outwardly from the cylinder 24 and acts as a cam follower. Supports which are not shown are also provided to confine the cam follower lug 44 to vertical movement.

Figure 4:
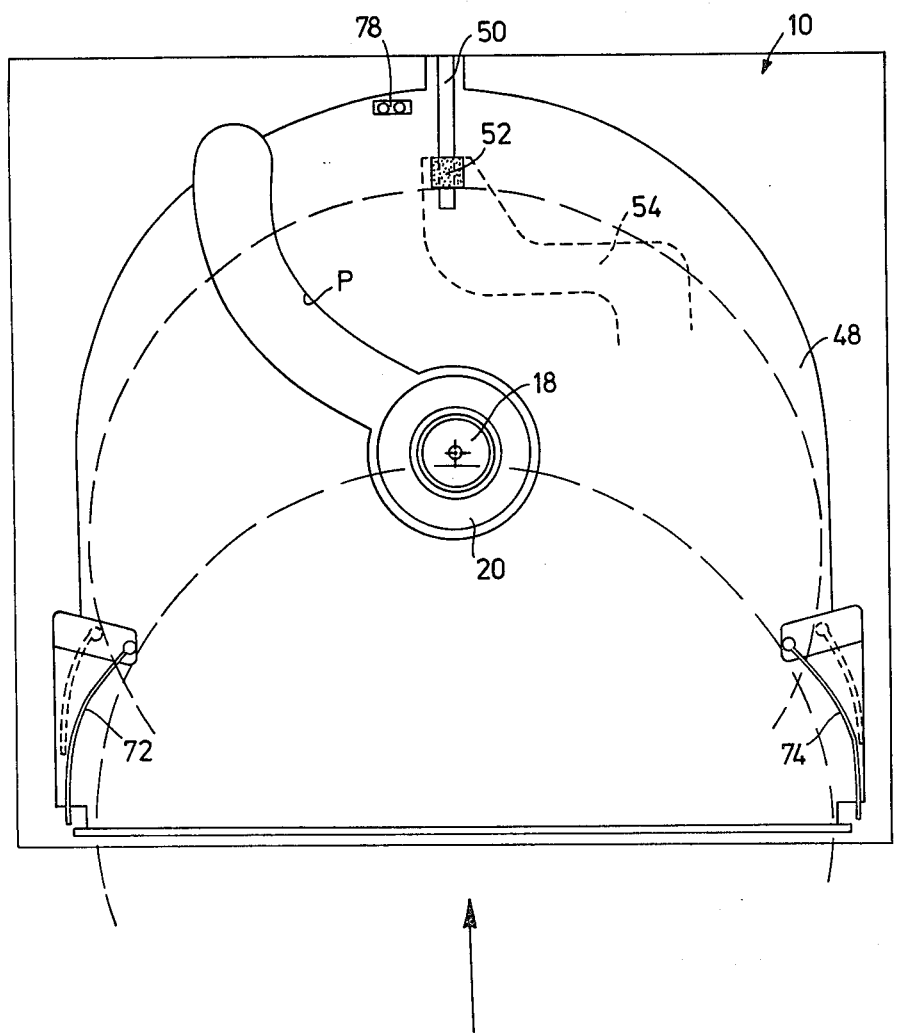
FIG. 4 is a fragmentary top plan view of the apparatus shown in FIG. 1 with portions of the mechanism shown as a disc record is inserted.
Figure 5:
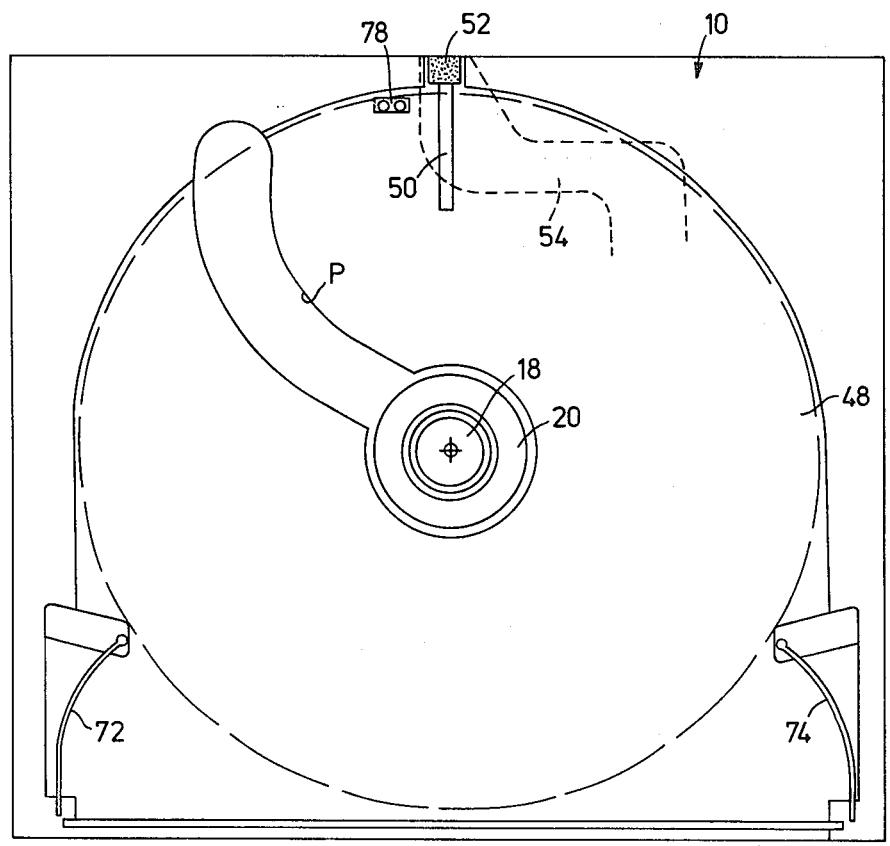
FIG. 5 is a top plan view similar to FIG. 4 showing portions of the mechanism with a disc record fully inserted and in playing position.

Further in carrying out the invention, motor driven means are also provided for ejecting a disc record from playing position through the entrance slot 14, coordinated with translation movement of the spindle housing 22 between the insertion and operative positions and the opening and closing of the gate 38. To this end, referring to FIGS. 4 and 5, mounted in the fixed housing 10 at the back of the horizontal cavity 48 in which the disc record is inserted through the entrance slot 14 is a radially extending groove 50 in the surface 16 which receives a slidable rubber stop 52 located to be engaged by the front edge of the disc record as it is inserted, as indicated in FIG. 4 by the arrow. This stop 52 is moved by the disc record toward the back end of the groove 50 as the inserted disc moves to its playing position. As shown in FIG. 5, in the playing position of the record, the stop is located spaced from the periphery of the record at the back end of the groove 50. The stop 52 (FIG. 2A) is carried by a flat slide plate 54 which is mounted in the housing 10 for horizontal movement as indicated by the arrow F in FIGS. 2 and 3 and is moved from the position of FIG. 3 to the position of FIG. 2 as the disc record is inserted. In the course of that movement, a spring 56 is shifted over center and resiliently holds the slide plate 54 in the position of FIG. 2.

Figure 2A:
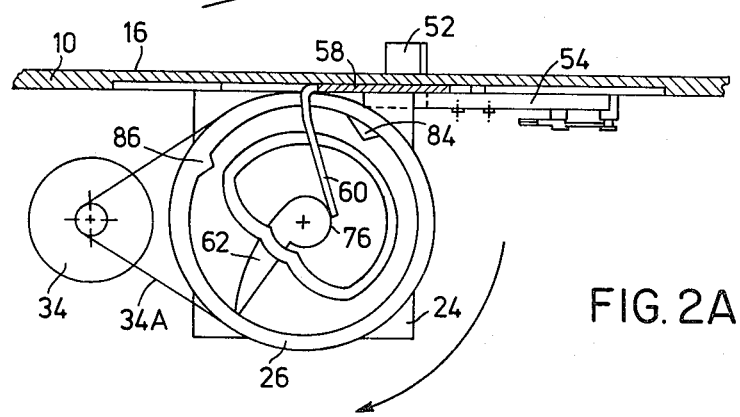
FIG. 2A is a fragmentary cross sectional view with parts shown in elevation taken substantially in the plane of lines 2A—2A of FIG. 2.
Figure 3:
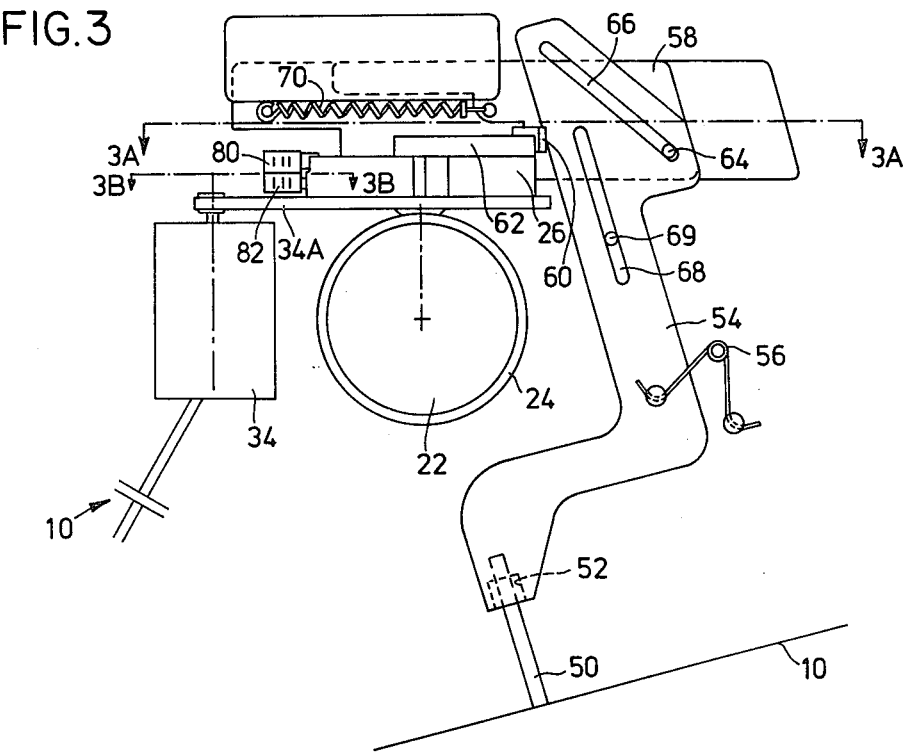
FIG. 3 is a view similar to FIG. 2 illustrating the components of the disc record ejection mechanism in the disc record ejected position.
Figure 3A:
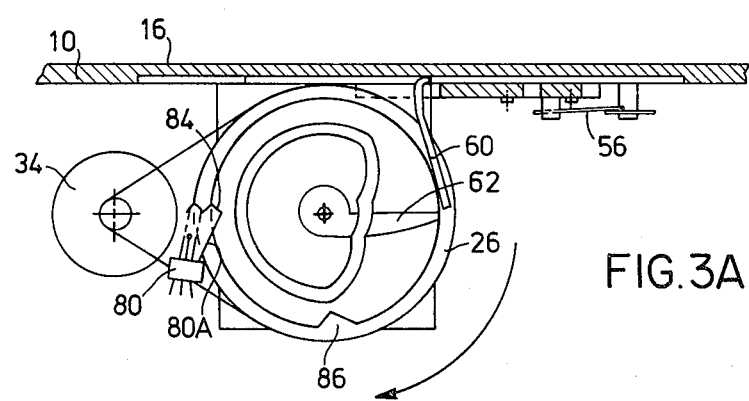
FIG. 3A is a fragmentary cross sectional view taken substantially in the plane of lines 3A—3A in FIG. 3.

The disc record is ejected by movement of the slide plate 54 from the position of FIG. 2 to the position of FIG. 3 by the motor drive cam member 26 that also translates the spindle 18 and operates the gate 38. For this purpose, a flat link 58 is slidably mounted on the fixed frame 10, as indicated in FIGS. 2 and 2A, and is connected to both the cam member 26 and the slide plate 54. The connection to the cam member 26 as shown in FIG. 2A involves a downwardly folded portion 60 that engages the surface of a cam finger 62 mounted on the outer face of the cam member 26. As the finger 62 is rotated, as indicated in FIGS. 2A and 3A, the folded portion 60 is urged outwardly by the elongated cam finger 62 to move the link 58 laterally to the right, as viewed in FIGS. 2A and 3A. That motion of the link 58 is transmitted to move the slide plate 54 in its own plane in the direction F by a pin 64 which is fixed to the link 58 and projects upwardly through an oblique slot 66 in the slide plate 54. A lengthwise guide slot 68 in the slide plate 54 aligned with the desired direction F and cooperating with a pin 69 on the frame 10 guides the movement of the slide plate.

To eject a disc record, the cam member 26 is rotated and, via the cam finger 62 and folded portion 60 of the link 58, urges the link 58 laterally to the right from the position shown in FIG. 2 to the position shown in FIG. 3 against the force of an extension spring 70. That movement produces, through cooperation of the pin 64 and oblique slot 66, movement of the slide plate 54 in the direction F from the position of FIG. 2 to the position of FIG. 3. With the stop 52 engaging the disc record, it will be ejected through the entrance slot 14. The disc record is ejected only after the gate 38 is opened and the spindle 18 and hub 20 lowered from engagement with a disc record in playing position. The movement of the slide plate 54 to eject the disc record is coordinated with the operation of the gate 14 and the translation of the spindle 18 by the cam member 26 and the relationship between the cam grooves 30, 46 and cam finger 62 on the surfaces thereof.

OPERATION

Insertion:

The initial position of the cam member 26 with the gate 38 open and ready for insertion of a record is shown in phantom in FIGS. 1A and 1B and FIGS. 3A and 3B. When inserted through the entrance slot 14, a disc record is subjected laterally to the action of two flexible fingers 72, 74 (FIG. 4) which are preferably of a resilient plastic material, for example, a material sold under the trademark DELRIN ®. The dimensioning of the fingers 72, 74 is such that the record may be passed between the fingers and held thereby against the stop 52, as indicated in FIG. 4, in an intermediate position. When the disc record is pushed further forward, its periphery, acting on the stop 52, displaces the stop along the groove 50 from the position shown in FIG. 4 to the position shown in FIG. 5, which is also illustrated as changes in position of the slide plate 54 from the position shown in FIG. 3 to the position shown in FIG. 2. This displacement of the slide plate 54 is also insured by the spring 56 as soon as that spring has passed its overcenter position. At the same time, the link 58 is subjected to the action of its extension spring 70 as the folded portion 60 of the link abuts against a hub portion 76 of the cam member 26, as shown in FIG. 2A. When fully inserted in the position of FIG. 5, the disc record comes adjacent an opto-electronic switch 78 which is provided in a control circuit for the drive motor for the spindle and the cam drive motor 34.

Figure 3B:
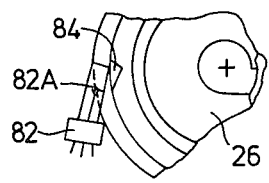
FIG. 3B is a fragmentary detail view taken substantially in the plane of lines 3B—3B of FIG. 3.

For controlling the operation of the apparatus, in addition to the opto-electronic switch 78, a pair of electrical switches 80, 82 are mounted side by side on the fixed housing 10 to be operated by the rotation of the cam member 26. For this purpose, two notches 84, 86 are provided in the periphery of the cam member 26 to cooperate with spring blades 80A, 82A of the switches 80, 82 respectively. One notch 84 is restricted in width and on the outer face of the cam member 26 so as to cooperate only with the blade 80A of the switch 80 as shown in FIGS. 3A and 3B. The other notch 86 is deep and cooperates with both switches.

When an inserted record causes the closure of the opto-electronic switch 78, this actuates the cam motor 34 and causes the rotation of the cam member 26 clockwise in the direction as viewed in FIG. 1B. Rotation of the cam member 26 of approximately 90 degrees from its start position shown in phantom in FIGS. 1A, 1B (and in FIGS. 3A, 3B) to the solid line position in these Figures, by cooperation of the cam groove 30 and the cam pin 32 raises the drive housing 22 and spindle 18 from the phantom position of FIG. 1 to the solid line position of FIG. 1. Also, the lug 44 is displaced by the cam track 46 and moves the gate 39 to close the entrance slot 14.

The notch 86 is rotated to the position of the switches 82, 84 causing the blades 82A, 84A of the switches to be received in the notch 86, actuating the switches. This causes the spindle drive motor to be activated while the cam drive motor is deactivated.

Ejection:

When the user acts on an ejection button or otherwise the circuit is operated to initiate ejection of a record, the cam drive motor 34 is again activated to rotate the cam member 26 in a clockwise direction as viewed in FIGS. 1B and 2A. This also cuts off the supply to the drive spindle motor and its rotation is braked either mechanically or electronically. Rotation of the cam member 26 via the cam groove 30 and the cam pin 32 lowers the spindle housing 22 and the spindle 18 from the operative position of FIG. 1 shown in solid lines to the phantom position shown in that Figure. The cam finger 62 on the face of the cam member 26 moves the folded portion 60 of the link 58 radially and moves the link 58 and thereby the slide plate 54 in the direction of the arrow F (FIG. 2). This displacement of the slide plate is also assisted after it has been initially started by the spring 56 after it has passed over center. The gate 38 is also lowered so as to open the slot 14.

The record is engaged by the stop 52 and moved laterally through the entrance slot to its ejected position. The cam drive motor 34 is deenergized when the notch 84 reaches the position shown in FIG. 3A by the activation of the switch 80. The record may then be withdrawn from the apparatus.

I claim:

1. In a disc record apparatus hving a fixed housing including an entrance slot for a disc record and a surface to slidably receive a disc record inserted edge first in its own plane through said slot to a playing position:
   a drive spindle for a disc record;
   a spindle housing including a drive motor for said drive spindle;
   means for mounting said spindle housing on said fixed housing for translation axially of said spindle and perpendicularly relative to said plane from an insertion position displaced from said plane to an operative position with said hub in engagement centrally with a disc record in playing position for rotating the disc record; and
   motor driven means for translating said spindle housing between said positions.

2. A player apparatus according to claim 1 including a movable gate for said entrance slot and motor driven means for opening and closing said gate so that a disc record may be inserted or ejected coordinated with translation movement of said spindle housing between said positions.

3. A player apparatus according to claim 2 in which said motor driven means for translating said spindle housing and for opening and closing said gate comprises a cam member connected to both said spindle housing and said gate.

4. A player apparatus according to claim 2 including motor driven means for ejecting a disc record from said playing position through said entrance slot coordinated with translation movement of said spindle housing between said positions and the opening and closing of said gate.

5. A player apparatus according to claim 4 in which said motor driven means includes a cam member connected to said spindle housing, said gate and said ejecting means.

6. A player apparatus according to claim 5 in which said motor driven means for ejecting a disc includes a spring loaded plate operated by inward movement of a disc record to compress said resilient means as a disc record is inserted to store energy for assisting the outward movement of the plate for ejecting a disc record.

7. A player apparatus according to claim 1 in which a spring loaded stop is pivotally mounted on said fixed housing, two flexible members are mounted on said fixed housing to engage the periphery of an inserted disc record, said flexible members cooperating with said stop to define a stable intermediate position of the inserted disc record partially inserted through said slot.

8. A player apparatus according to claim 1 in which said motor driven means for translating said spindle housing includes a rotatable cam member and a cam follower connected to said spindle housing.

9. A player apparatus according to claim 1 in which said fixed housing includes a horizontal surface for slidably receiving a disc record, and a cylinder extending downwardly from said horizontal surface for mounting said spindle housing for translation axially of said spindle and perpendicular relative to a disc record in playing position.

* * * * *